UNITED STATES PATENT OFFICE.

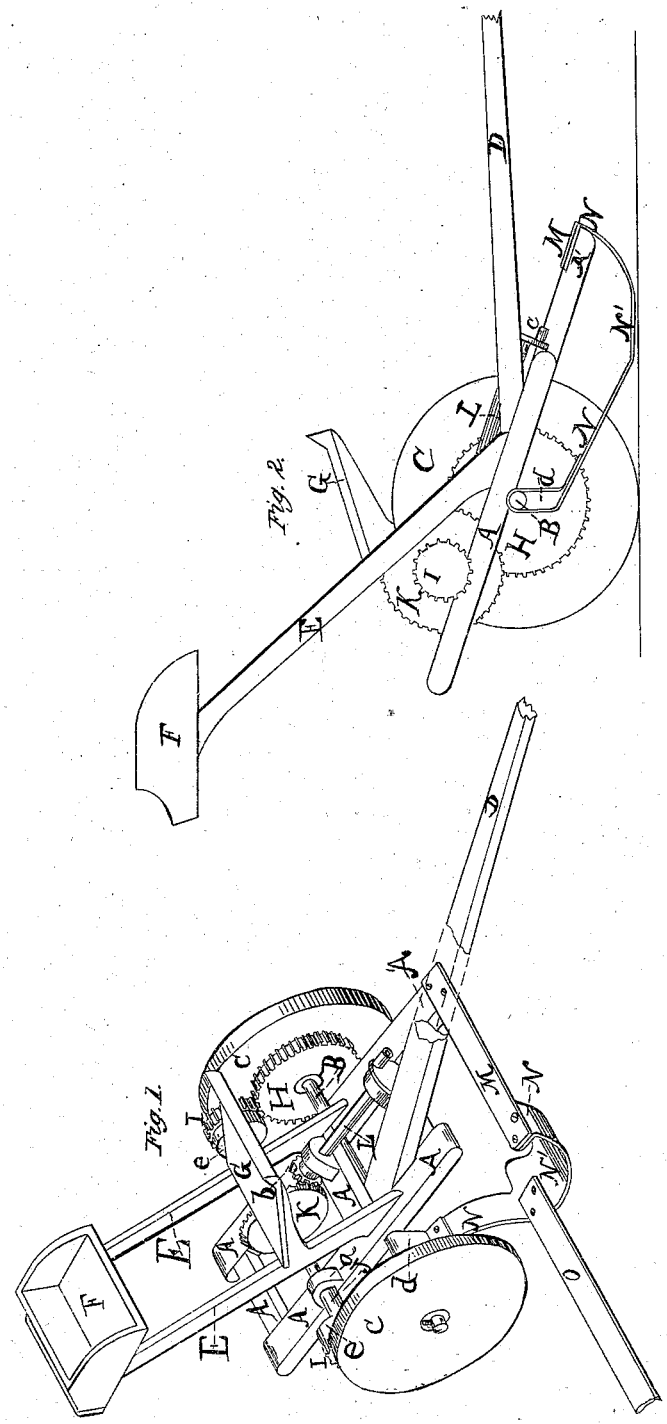

WALTER A. WOOD, OF HOOSICK FALLS, NEW YORK.

IMPROVEMENT IN MOWING-MACHINES.

Specification forming part of Letters Patent No. 23,057, dated February 22, 1859.

*To all whom it may concern:*

Be it known that I, WALTER A. WOOD, of Hoosick Falls, in the county of Rensselaer and State of New York, have invented certain new and useful Improvements in Grass Cutting or Mowing Machines; and I do hereby declare the following to be a full, clear, and exact description of the construction and operation of the same, reference being had to the accompanying drawings, making a part of this specification, in which—

Figure 1 represents a perspective view of the machine. Fig. 2 represents a side view, with the wheel removed.

Similar letters of reference, where they occur in the separate figures, denote like parts of the machine in both figures.

The cost of machines as heretofore constructed for mowing grass, their size and weight, together with the power required to operate them, have tended to keep them out of general use. With a view of making a grass-cutting machine that in price will fall within the reach of any farmer, and in size and weight be capable of being worked by any ordinary team, and yet have the requisite strength and endurance to stand the work it is to perform, I have, after much thought and experiment, produced a cheap, light, and effective machine for the purpose. By making my machine light I get many advantages, which I will mention, besides that of cheapness of construction. By using a light finger-bar I can avail myself of the springing or yielding of said bar as it passes over any inequalities in the ground, or when the wheel should drop into a hole or depression. By using a light cutter-bar I can give it more speed, as there is not so much weight to stop and start at the ends of its vibrations; and, as a consequence, upon the more rapid motion of the cutters the machine itself need not be so rapidly drawn over the ground. I use, too, a very short crank and short stroke, which of course removes much of the strain upon the machine, while it also relieves the team of the power required to drive a long stroke, which is very considerable. By these changes I reduce the cost, the weight, and the power to drive from thirty-three to fifty per cent., and yet produce as effective a mower as any now in use. The changes I have made to effect this great reduction in cost, weight, and power may appear small, but were only arrived at by much experiment and thought, and particularly against the prejudices of builders and users; and that I am the first to introduce this character of machine argues strongly that I am also the first to invent them.

To enable those skilled in the art to make and use my invention, I will proceed to describe the same with reference to the drawings.

A represents a rectangular frame, balanced upon an axle, B, that is supported upon two carrying and driving wheels, C C. One of the rails or longitudinal pieces A' of the frame projects farther forward than the other, and for a purpose that will be presently described. The wheels C C are of very small diameter for the purpose of carrying out my general plan of lightness in the construction of the machine; and by using both wheels as drivers there is no lost motion of the cutters in turning the machine around at the ends of the swath, as there is when a single driver is used. By using both wheels as drivers I get sufficient adhesion between them and the ground—light as the whole structure is—to drive the cutter without any slipping of said wheels.

The tongue, D, is a rigid one, its heel starting from near the axle, which is at about the center of the main frame; and said tongue may be somewhat nearer the wheel next the cutters than the other one for the purpose of counteracting side-draft, and to make suitable provision or a place for the crank-shaft on said main frame.

The arms E E, that sustain the driver's seat F, are secured to the main frame at or near a point over the axle B, so that the driver, in his seat and with his feet on the support G, may, with a slight movement of his body, rock the frame on its balanced point (the axle) and thus raise or lower, to a certain extent, the finger-bar and cutters, the tongue, which is secured at its point to the breasts or necks of the team, acting as a counter-lever against the weight of the driver in his seat, and thus preserving the general position of the cutters that is best adapted to the ground over which it is to pass.

On the inner faces of the supporting and driving wheels C C there are cog-wheels or gears H, that take into pinions I I on the ends of a shaft, J, supported in suitable boxes, a, on the main frame, behind the axle B, and thus give motion to said shaft J.

At or near the center of the shaft J there is a bevel-gear, K, that meshes with a bevel-pinion, b, on the rear end of the crank-shaft L, which extends forward to the line of the cutter-bar, and has upon its forward end a crank or wrist pin, c, to which the cutter-bar may be connected by a pitman, and by which motion may be given to said cutter-bar and the cutters upon it. The sweep of my crank may be not more than one and one-quarter inch. I thus get a higher motion of the cutters on my machine than that of any other machine of which I have knowledge, and the advantage of a high motion is that you can drive the team at a slower pace, and at the same time cut the grass more evenly. The machines as now constructed leave the stubble in diamonds, while mine leaves a perfectly smooth, flat surface.

A thin flat bar, M, is secured to the long rail A' of the frame, and projects from thence toward the cutter-bar side of the machine. This bar M, for the sake of lightness, strength, and elasticity, may be made of steel, or of cold-rolled iron, though of course I do not limit its construction to any specific material.

To the projecting end of the bar M is attached the end of a bent bar, N, that projects downward sufficiently to form a shoe and shield, N', for the hinge or joint where the connecting-rod is attached to the cutter-bar. The opposite end of this bent bar N has a loop, d, upon it, which goes over or around the axle B, so that the wheel on that side, or both of them, may drop into a depression, or the shoe part N' may pass over any inequality without injury to the cutters, inasmuch as the loop d allows the axle to play up and down in it, and the spring of the bar M will allow the heel of the finger-bar, with the bent bar N, to rise to any inequalities in the ground.

O is the finger-bar. It is permanently attached to the bent bar N, and may taper from that point to its outer end. It is made quite thin, and may, to give it the elasticity which it should have, be made of cold-rolled iron. The cutter-bar may be of steel or cold-rolled iron. It is also made light and thin, so that when the outer end or any portion of the finger-bar should meet any obstruction both the finger-bar and cutter-bar may yield or spring within themselves, as well as to receive the yield or spring of the bar M.

It is obvious that in using both wheels as drivers they should, in backing the machine, be capable of moving independently of the axle, or move without working the gearing. For this purpose I use self-acting clutches in the drums e e, which connect or disconnect the pinions I from the shaft J as the machine goes forward or backward, or in turning it around, and thus one wheel may go forward and continue to drive the cutter, while the other may stand still or move backward without in any wise injuring the gearing or stopping the cutter-bar.

Having thus fully described the nature and object of my invention, what I claim therein as new, and desire to secure by Letters Patent, is—

Connecting the bent bar that carries the finger and cutter-bar to the main frame by the spring-plate M, and to the axle by the loop d, so that the finger-bar may rise and fall independent of the wheel or main frame, or the main frame independent of the finger-bar, substantially as herein described.

WALTER A. WOOD.

Witnesses:
  LEONARD KING,
  C. E. PETERS.